United States Patent [19]

Caruel et al.

[11] 4,241,586

[45] Dec. 30, 1980

[54] COMBUSTION CHAMBER OF GAS TURBINE ENGINES

[75] Inventors: Jacques E. J. Caruel, Maincy; Guy D. Stora, Melun; Gilles M.-J. B. Schmitt, Cesson la Foret, all of France

[73] Assignee: Societe Nationale d'Etude et de Construction de Moteurs d'Aviation, Paris, France

[21] Appl. No.: 964,427

[22] Filed: Nov. 28, 1978

[30] Foreign Application Priority Data

Nov. 29, 1977 [FR] France .............................. 77 35875

[51] Int. Cl.³ .......................... F02C 7/18; F02C 7/22
[52] U.S. Cl. ........................................ 60/738; 60/756
[58] Field of Search .................... 60/39.66, 39.71, 738, 60/756

[56] References Cited

U.S. PATENT DOCUMENTS 4,085,581  4/1978  Carvel et al. ...................... 60/39.66

OTHER PUBLICATIONS

International Patent application, Publication No. WO 79/00387, published Jun. 28, 1979, U.S. Priority date Dec. 14, 1977.

Primary Examiner—Robert E. Garrett
Attorney, Agent, or Firm—Bacon & Thomas

[57] ABSTRACT

The disclosure is of a combustion chamber having prevaporizing pipes for the injection of fuel and shield cups intended to play the role of thermal barriers, upon which the hot jets issuing from the injectors are broken up. The shield cups have ribs toward which high velocity jets of air are directed, the jets of air issuing from small orifices. Other small orifices may addtionally open on a ridge of the ribs, so as to form supplementary jets of air convergent with the first set of jets of air.

5 Claims, 6 Drawing Figures

COMBUSTION CHAMBER OF GAS TURBINE ENGINES

BACKGROUND OF THE INVENTION

The present invention is an improvement in combustion chambers and particularly an improvement of the device described in U.S. Pat. No. 4,085,581, to which reference will be made herein. The improvement is intended for combustion installations, particularly gas turbine engines for turbojet aircraft. The installations to which the invention applies comprise a combustion chamber defined by annular walls traversed by lateral openings for the transverse penetration of air, and an end wall in the shape of a dome.

The injection of the fuel is effected by prevaporizing pipes secured to the end of the chamber, said pipes protruding into the chamber proper and consisting of a hollow structure comprising an inlet portion connected with sources of liquid fuel and or air, and of at least one outlet portion terminating in an escape orifice facing the dome constituting the end of the combustion chamber.

In order to protect the end of the combustion chamber from the impact of the hot jet coming from the prevaporizing pipes, it was found to be advantageous to interpose in the trajectory of the hot jets shield cups which play the role of heat shields and which have no other structural function. In the case of annular chambers it is of advantage to provide each pipe of prevaporization with such a cup having the configuration of a section of a crown, the entirety of the cups, once installed, forming an essentially continuous crown defining an annular space together with the end of the combustion chamber or dome.

Because the cups are exposed to high thermal stresses particularly in the zones of the impact of the jets issuing from the prevaporizing pipes, attempts were made to cool said cups by introducing air through the dome, into the annular space defined between the cups and the dome. Various solutions have been proposed to improve the efficiency of the cooling process, such as that described in French Pat. No. 2,152,465. In a general manner, in the first known embodiments, the cooling air was introduced through orifices of the dome and circulated behind the cup and then evacuated around its periphery toward the combustion zone of the chamber.

This mode of realization has a certain number of disadvantages; in particular, at low ratings a portion of the fuel trickles down the cold wall presented by the cup without participating in the combustion process, to the extent to which this portion subsequently reaches the walls of the chamber itself and is entrained by the cooling films of the chamber. In addition, the combustion reactions rapidly becoming limited in the proximity of the cold wall. This results in non-negligible rates of pollutant emission at these speeds, particularly of unburned hydrocarbons and CO.

The U.S. patent referred to proposed to reduce the emission of pollutants and thus to improve the yield of such combustion chambers, by piercing the cups with a large number of small orifices in order to generate high velocity air jets which on the one hand atomize the fuel trickling onto the cups and on the other hand increase the local turbulence. These orifices are supplied with air from a supply chamber formed in the space between the dome and the cups by means of small walls. The small walls are carried on the face of the cup turned toward the dome, are supported by said dome and divide the space between the dome and the cups, on the one hand, into a lateral annular double region where cooling takes place successively by means of the impact of the ends of the cup and by the film of air at the head of the chamber, and on the other hand, into a central annular region constituting a supply chamber, where the cup has orifices inclined toward the outside of the combustion chamber and dimensioned so as to create a plurality of air jets at high velocities.

These arrangements resulted in an appreciable improvement of combustion yields at reduced ratings for the type of chamber described, as indicated hereinabove.

SUMMARY OF THE INVENTION

The present improvement proposes to further improve the results obtained with the arrangement described in the U.S. patent. For this purpose, the general architecture of the cups is preserved, in particular the small walls and the small orifices are preserved, but there are added further on the face of the cup turned toward the downstream part of the combustion chamber, ribs presenting at least one ridge. The orifices of the cup are then drilled so as to direct the jets of air toward the ribs and more precisely toward the ridge of the ribs. The protrusions formed by the ribs play the role of obstacles for the sheet of fuel circulating on the cup; the sheet is thus broken up either on a ridge of the ribs or on the joining angle of the cup and the rib. This phenomenon is sustained and accelerated by the jets of air coming from the small orifices of the cup, which in addition atomize the fuel. The presence of the obstacles results in further and supplemental growth of turbulence. The result is an improvement of the entirety of the advantages already obtained by means of the previous devices.

The geometry and disposition of the ribs, together with the relative position of the orifices for the introduction of air with respect to the ribs, may differ widely. In any case, however, the ribs must be arranged so that all of the fuel film that may trickle down the cup will be intercepted, i.e. that they must form a frame around the zone of impact of the hot jets issuing from the prevaporizing pipes.

Under these conditions the air injection orifices of the cup will be drilled within the perimeter defined in this manner in the proximity of the ribs with their axis inclined toward the latter. It should be noted that—as in the U.S. patent referred to—the inclination of the orifices must not be excessive, so that the jets of air issuing from them retain a velocity component normal to the cup, said velocity component being non-negligible, to preserve the role of the jets in atomizing the fuel directly intercepted.

It has also been found advantageous to drill supplementary orifices into the cups for the introduction of air, said orifices traversing the ribs and opening in the vicinity of their ridge upon which the fuel film is broken up; these supplementary orifices converge in their direction with that of the first orifices of the cup, and are supplied with air by means of the supply chamber defined by the small walls of the cup between the dome and the cup.

BRIEF DESCRIPTION OF THE DRAWINGS

Different embodiments of the improvement constituting the invention will be described hereafter, having reference to the figures attached hereto.

DESCRIPTION OF THE PREFERRED EMBODIMENTS

Concerning the general architecture of the cup, its location and attachment to the bottom of the combustion chamber, reference will be made particularly to FIGS. 3 and 4 of U.S. Pat. No. 4,085,581 and to the pertinent parts of the description.

Cup 1 according to the invention is a section of an annular crown; each prevaporizing injector or pipe is equipped with such cup, as is the case in the U.S. patent, with the entirety of the cups forming an annular crown.

Figure 2:
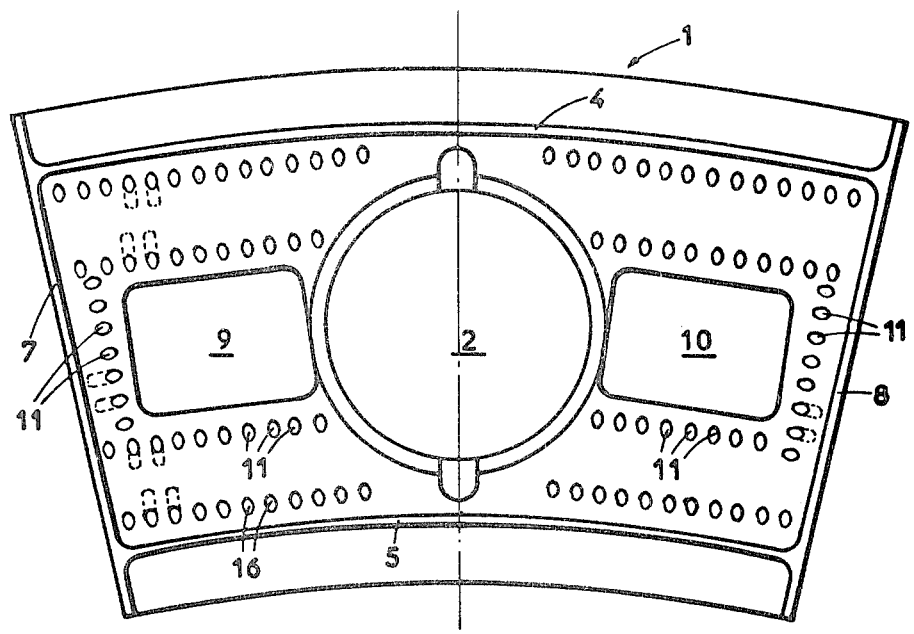
FIG. 2 shows the other face of the cup of FIG. 1.

The cup 1 has an opening 2 defining a passage for a prevaporizing pipe and means for securing it to the pipe, not shown. On the face toward the end 3 of the chamber (FIG. 4) the cup has essentially circumferential small walls, 4, 5, which outline the chamber 6 to supply air to the orifices drilled through the cup. In the present case, the cup 1 also has radially directed small walls, 7, 8 (FIG. 2).

The face of the cup turned toward the end of the chamber 3 has been thinned at 9 and 10 in face of the impact zone of the hot jets issuing from the two branches of a T forming the prevaporizing injector; this is done for the purpose of improving the exchange with the cooling gas circulating in the supply chamber 6 and to reduce heat conduction in the cup itself. The supply chamber is supplied with air in accordance with one of the arrangements of the U.S. patent. The end 3 of the combustion chamber also has holes to supply cooling air for the lateral zones of the cup, as is explained in the U.S. patent; the trajectory of this cooling air is represented by the arrows f (FIG. 4).

A large number of orifices, such as 11, is drilled through the cup 1 with an inclination such that the jets of air issuing from them are directed toward the outside of the cup, while retaining a velocity component normal to the cup, which is not negligible. The role of these jets of air is described in detail in the U.S. patent. The air is supplied from the chamber 6.

An improvement of the effects of this air injection is provided by arranging on the face of the cup turned toward the combustion chamber a number of ribs, such as 12 and 13, which are interrupted at the level of the passage of the injector 2 and the radial ribs 14, 15. The elements of the ribs 12 and 13 may consist of the chords of two concentric circles or they may be circular segments as is the case for the small walls, 4, 5. It should be noted that the orifices, such as 11, open to the inside of the perimeter defined by said ribs while directing the jets of air toward the ribs (FIG. 4). Other orifices are also provided, such as 16, drilled into the cups and also supplied with air from the supply chamber 6, but they open through a ridge 17 of the ribs. These holes 16 are inclined so as to send jets of air in a direction converging toward the direction of the holes 11.

The relatively offset disposition of the holes 16 and 11 has been established to intercept the major part of the sheet of fuel.

Figure 3:
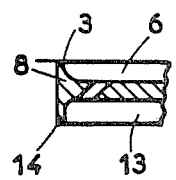
FIG. 3 is a view in section of a detail taken on line AA of FIG. 1.
Figure 4:
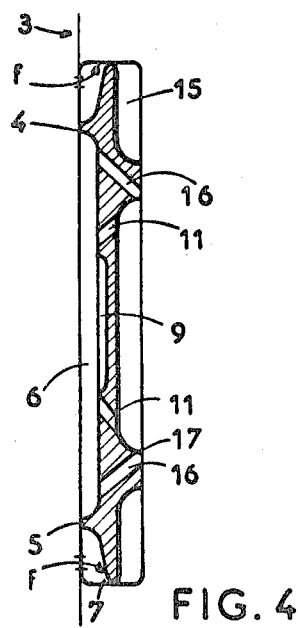
FIG. 4 is a sectional view taken on the line BB of FIG. 1.

FIG. 3 shows in detail a radial rib 14 which does not have orifices as at 16, it should be understood that this type of disposition may be employed for all of the ribs, but better efficiency is obtained if the two types of air injection are combined, i.e. the orifices 11 and 16, because of the resulting increased turbulence.

Figure 5:
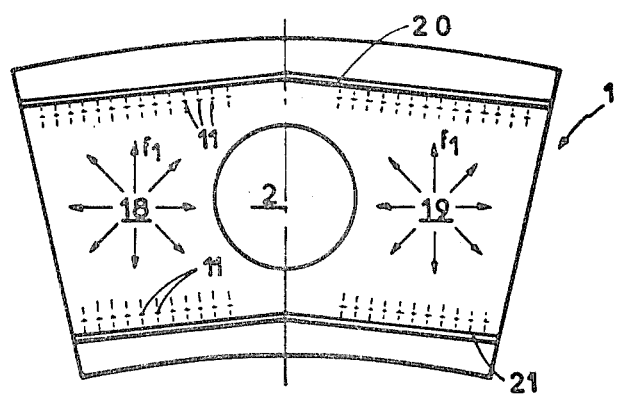
FIG. 5 shows schematically a variant of the arrangement of the ribs.
Figure 6:
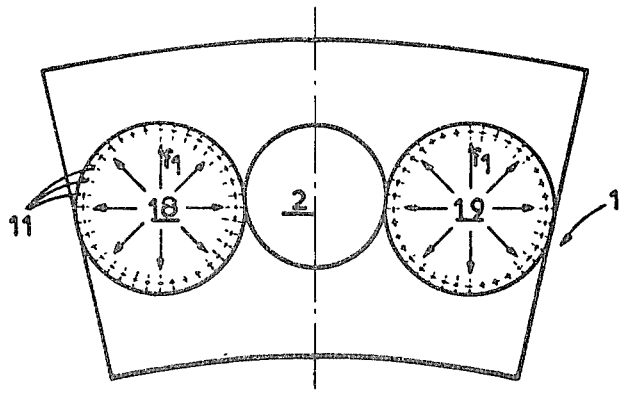
FIG. 6 shows schematically another variant of the arrangement of the ribs.

Various arrangements of the ribs may be envisioned, such as those shown in FIGS. 5 and 6. The point these arrangements have in common is the possibility of intercepting all of the fuel that may be deposited on the cup; this is to say that the ribs must always define a perimeter, possibly in combination with the passage 2 of the prevaporizing pipe, which surrounds the hot impact zones 18 and 19, from which a liquid fuel circulation is generated according to the arrows $f_1$. The ribs form an obstacle which makes it possible to separate the sheet of fuel at the ridge. The injection of air toward the ridges atomizes the fuel and provides the turbulence necessary for the combustion of the fuel.

The turbulence may be increased by providing convergent air injections and drilling orifices for this purpose in the cup, said orifices opening in the proximity of the ridge of the ribs.

FIG. 5 schematically represents a cup according to the invention, viewed from downstream in the combustion chamber; only two ribs 20, 21 are provided on this cup; injection holes, such as 11 are drilled to direct jets of air toward the ribs, while orifices such as 16, may also be provided in the ribs 20 and 21. The entirety of the ribs 20, 21 of adjacent cups in place thus form the perimeter upon which the sheet of fuel circulating from the impact zones 18 and 19 according to the arrows $f_1$ on the cup will be separated. Atomization is assured by means of the jets of air. It should be noted that the ribs 20, 21 are right segments which form two groups of chords of two concentric circles in order to simplify their machining, but that they could be in the form of segments of two concentric circles.

Figure 1:
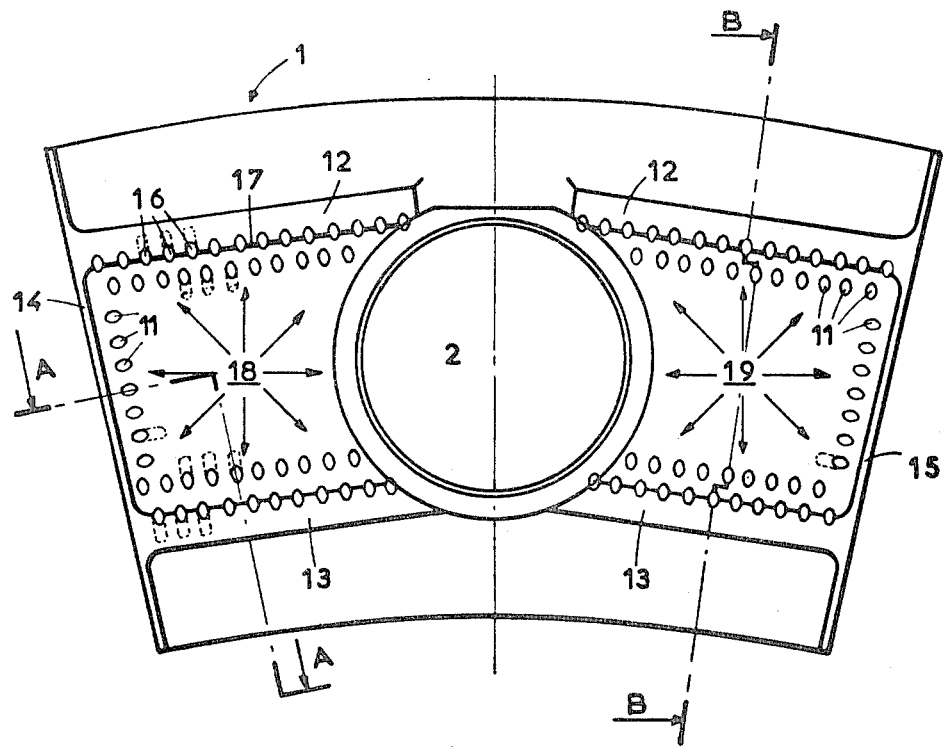
FIG. 1 represents a cup according to the invention viewed from the downstream part of the combustion chamber.

FIG. 6 illustrates another variant in which each impact zone 18, 19 is surrounded by a circular rib, toward which the orifices 11 direct high velocity jets of air. Obviously, it is also possible to provide further orifices such as 16 in FIG. 1, opening in the vicinity of the ridge of the rib and injecting a second series of air jets in a direction convergent to those of the first orifices.

The present invention thus makes it possible to improve the results obtained with the arrangement of U.S. Pat. No. 4,085,581 to the extent that the entire sheet of fuel from the hot points of impact 18 and 19 is intercepted by ribs, then atomized by means of different orifices such as 11 or 16, the existence of high velocity jets of air generating a high turbulence.

We claim:

1. In a gas turbine combustion chamber having longitudinal side walls, an upstream end wall, at least one transverse shield cup in said chamber adjacent to and spaced from said end wall, partition means defining a plenum chamber between said end wall and shield cups, first passage means for conducting cooling fluid through said end wall into said plenum chamber and second passage means from said plenum chamber through said shield cup, and prevaporized fuel injecting means for directing jets of fuel onto the downstream face of said shield cup, the improvement comprising:

rib means having at least one ridge on the downstream face of said shield cup;

said second passage means comprising small orifices adjacent said rib and arranged to direct first jets of fluid toward said ridge;

said second passage means including orifices from said plenum chamber opening in the region of said ridge and inclined to direct second jets of said fluid in a direction convergent to said first jets.

2. A combustion chamber as defined in claim 1 wherein said rib means define a perimeter surrounding the impact zone of said jets of fuel.

3. A combustion chamber as defined in claim 1 wherein said fuel injecting means extend through said end wall and an opening in said shield cup, said rib means comprising two ribs on opposite sides of said opening each of said ribs defining a closed geometric figure.

4. A combustion chamber as defined in claim 1 wherein said cup has radial edges and said rib means includes a rib on each radial edge of said cup.

5. A combustion chamber as defined in claim 2 including a plurality of said cups and fuel injecting means, said rib means define an annular perimeter around each zone of impact of fuel on each of said cups.

* * * * *